United States Patent [19]

Van Eijk

[11] Patent Number: 5,023,094

[45] Date of Patent: Jun. 11, 1991

[54] RETARDING THE FIRMING OF BREAD CRUMB DURING STORAGE

[75] Inventor: Johannes H. Van Eijk, Bilthoven, Netherlands

[73] Assignee: Gist-Brocades N.V., Delft, Netherlands

[21] Appl. No.: 421,997

[22] Filed: Oct. 16, 1989

[30] Foreign Application Priority Data

Aug. 10, 1989 [EP] European Pat. Off. ......... 89202074.4

[51] Int. Cl.$^5$ ............................................. A23L 1/105
[52] U.S. Cl. ........................................ 426/20; 426/64
[58] Field of Search ...................... 426/20, 19, 64, 61, 426/62, 63

[56] References Cited

U.S. PATENT DOCUMENTS

| | | | |
|---|---|---|---|
| 3,249,512 | 5/1966 | Bode | 426/20 |
| 4,654,216 | 3/1987 | Carroll | 426/20 |

FOREIGN PATENT DOCUMENTS

| | | | |
|---|---|---|---|
| 3402778 | 8/1985 | Fed. Rep. of Germany | 426/20 |
| 58-141755 | 8/1983 | Japan | 426/20 |
| 62-79746 | 4/1987 | Japan | 426/20 |

OTHER PUBLICATIONS

Pomeranz 1964, Food Technology, Oct., pp. 1642-1644.

*Primary Examiner*—Carolyn Paden
*Attorney, Agent, or Firm*—Bierman and Muserlian

[57] ABSTRACT

Retardation of crumb firming during storage of a bread product by the incorporation of an effective amount of a thermostable glucanase into the dough before baking which thermostable glucanase restrains the retrogradation of the amylopectin without substantially affecting the amylose component of the starch.

14 Claims, 1 Drawing Sheet

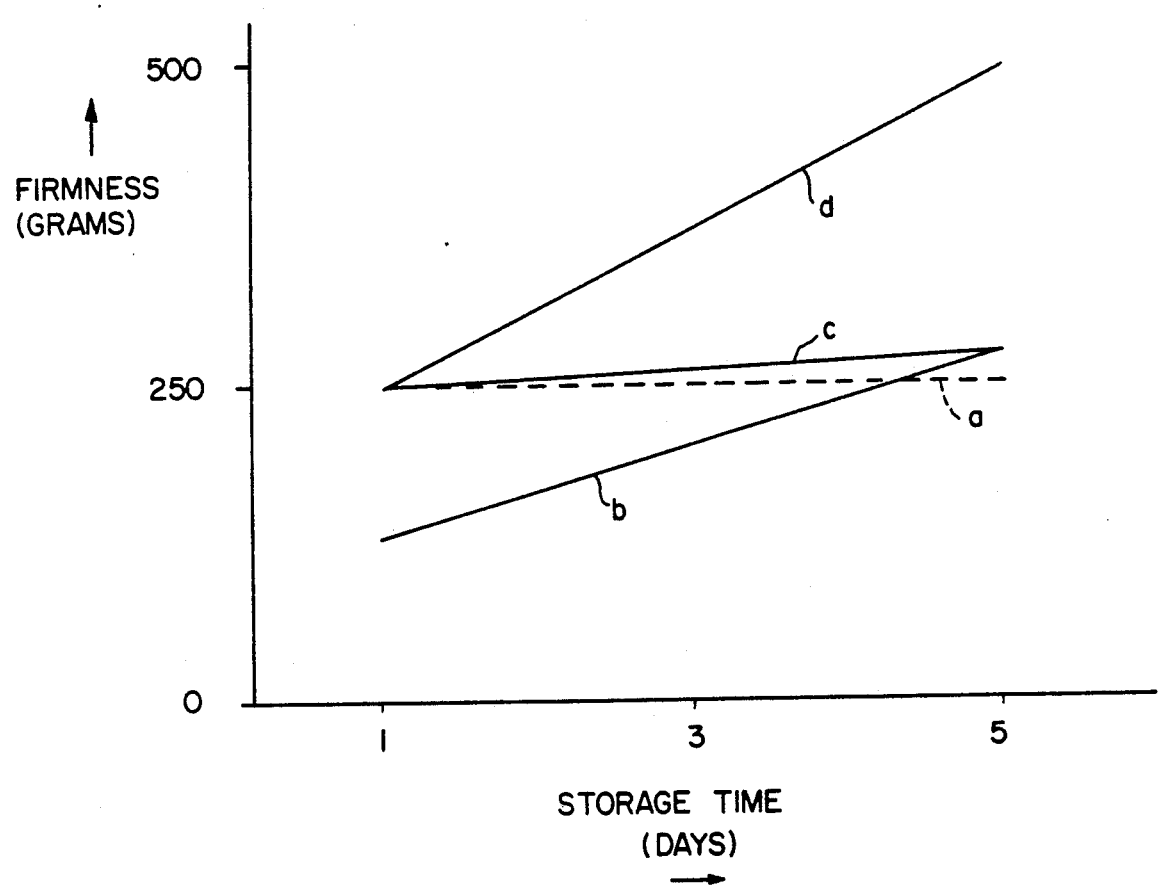

RETARDING THE FIRMING OF BREAD CRUMB DURING STORAGE

STATE OF THE ART

Staling of bread has been recognized as a problem which becomes more serious as time between the moment of preparation of the bread product and the moment of consumption becomes greater. The term staling is meant in principle all changes undesirable to the consumer in the properties of the bread product after leaving the oven. The most important changes are:

1. increase of the firmness of the crumb,
2. changes in the crust which becomes tough and leathery due to the transfer of moisture from the crumb to the crust of the bread product,
3. evaporation of moisture from the crumb,
4. loss of bread flavor and changes in bread flavor and
5. microbial deterioration. As used herein, the terms "bread" and "bread product" are intended to apply generally to bakery products.

Changes in the bread begin immediately after leaving the oven but up to 4 hours after leaving the oven, these changes are not considered as being negative. The sliceability and the chewing properties even improve in this period as a result of a recrystallization phenomena of the starch which has been gelatinized during baking. However, the recrystallization process of the starch continues during storage of the bread and the firmness of the bread crumb increases further during storage up to a level which is considered as being negative. The increase in crumb firmness, which is considered as the most important aspect of staling, is recognized by the consumer a long time before the bread product has become unsuitable for consumption.

Studies on bread staling indicate that the amylose and amylopectin in bread crumb, principally the amylopectin, are involved in staling. Apparently, the linear carbohydrate chains of amylose crystallize almost immediately (within the first few hours after baking), thus causing the setting of the crumb structure. The firmness of fresh bread crumb is determined mainly by the amylose component which has crystallized into an amylose gel during baking and cooling of bread. During storage, the branched carbohydrate chains of amylopectin associate or align over a period of time, generating the firmness and reduction in soluble dextrins that characterize stale crumb. Thus, slow crystallization of the amylopectin component during storage further strengthens the starch gel composed of crystallized amylose.

The prior art already suggests ways to diminish the negative aspects of bread staling but all suggestions so far relate to improvement of the softness of the crumb directly after baking. A lower starting value for the crumb firmness directly after baking will result in a lower value for crumb firmness after a certain storage period without changing the rate of crumb firming. With this, the point in time where the consumer no longer accepts the level of firmness is postponed.

The reduction of the firmness of the crumb results from addition to the dough of α-amylase (cereal or bacterial) or emulsifiers. The disadvantages of this prior art solution are a too high starting value for softness of the crumb, resulting in inferior mouth feel and inferior sliceability of the fresh bread. Moreover, by the use of emulsifiers, the bread crumb has a weak or non-resilient character and by using α-amylase, the bread crumb also tends to give a gummy mouth feel, especially when the dosage of malt or bacterial α-amylase is not properly controlled.

U.S. Pat. No. 4,654,216 describes a procedure in which this last disadvantage is said to be avoided by the addition of bacterial or cereal α-amylase in combination with pullulanase to the dough. The α-amylase provides a higher softness to the bread crumb, while pullulanase avoids gumminess of the bread crumb caused by small (branched) dextrins formed during degradation of starch by α-amylase. Promozyme TM, which is not a thermostable enzyme, was used as pullulanase which alone did not have a crumb softening effect according to this patent. The explanation of the patent is that the use of Promozyme TM reduces gumminess by debranching low molecular weight dextrins.

Although one disadvantageous effect of the use of α-amylase is prevented, the crumb of the freshly baked product is still very soft due to an overdextrination of the amylose component whereas the retrogradation of the bulk of the amylopectin component is not affected. Thus, α-amylases and emulsifiers influence especially the softness of the bread directly after baking either by degrading or by complexing the amylose component. However, they do not affect the increase in crumb firmness during further storage which is caused by crystallization of the amylopectin component.

OBJECTS OF THE INVENTION

It is an object of the invention to provide a process for the production of a bread product having a retarded rate of crumb firming and the bread products produced thereby.

These and other objects and advantages of the invention will become obvious from the following detailed description.

THE INVENTION

The novel process of the invention for producing a bread product with a retarded rate of crumb firming comprises incorporating into the bread dough before baking a sufficient amount of an enzyme capable of preventing or at least retarding retrogradation of amylopectin. Preferably, the enzyme does not substantially affect the retrogradation behavior of the amylose component.

Therefore, the present invention provides a process for the production of a bread product having a retarded rate of crumb firming during storage by the addition to the dough before baking of at least one thermostable enzyme which is able to selectively modify the crystallization properties of the amylopectin component during baking. By the present invention, bread products are obtained in which the resilience of the crumb directly after cooling down to room temperature is not substantially reduced.

In the invention, a thermostable enzyme advantageously which is capable of debranching amylopectin by splitting α-1,6 glucosidic linkage is advantageously used. Such α-1,6 endoglucanases are known in the literature e.g. as pullulanase, isoamylases or R-enzyme. Isoamylase and R-enzyme split α-1,6 linkages in amylopectin and pullulanase will also hydrolyse α-1,6 lingages in pullulan. Furthermore, thermostable α-1,4 exoglucanases such as β-amylase or amyloglucosidase can also be used. These exoamylases are able to split off glucose (amyloglucosidase) or maltose (β-amylase) from the non reducing chain-ends of amylose and amylopectin.

The tendency of amylopectin to recrystallize depends mainly on the mean chain length of the linear α-1,4 carbohydrate chains of amylose and amylopectin. Because the mean chain length of the linear α-1,4 side chains in amylopectin is much smaller than the mean chain length of amylose (15-50 and 500-2000 glucose units, respectively), these exoenzymes will rather selectively reduce the tendency of amylopectin to recrystallize. In contrast, the crystallization properties of amylose will hardly be affected by these exoenzymes after removing 5-15 glucose units from the long amylose chain.

Advantageously, 250 to 75,000 U/kg, preferably 2,500-25,000, U/kg of a thermostable pullulanase and/or 25,000-500,000 U/kg, preferably 50,000-250,000 U/kg of thermostable amyloglucosidase and/or 12,500 to 250,000, preferably 25,000-125,000 U/kg of the thermostable α-amylase are added (the quantities are based on kg of flour).

Unit (U) means the amount of enzyme producing 1 μmol per minute at 80° C. In the case of pullulanase, this means the formation of 1 μmol of maltotriose per minute from pullulan. In the case of amyloglucosidase, 1 unit produces 1 μmol of glucose per minute from Zulkowsky starch at 80° C. In the case of α-amylase, 1 unit produces 1 μmol of maltose per minute from Zulkowsky starch at 80° C.

It has been found that bread originating from a dough containing these thermostable starch degrading enzymes shows a crumb having a resilience, after cooling down to room temperature, which is comparable to that of bread prepared from dough which did not contain such an enzyme. It will be appreciated that these thermostable enzymes only affect the firmness of the bread crumb during storage. They do not significantly affect the initial firmness of the bread crumb directly after cooling, and therefore the risk of overdosage is avoided. A suitable dosage can be determined easily by the skilled person in the art.

Enzymes which are preferably applied to retard the rate of crumb firming are at least one enzyme selected from the group consisting of thermostable pullulanase and thermostable exo amylases. Examples of thermostable pullulanase are produced by the following organisms: *Pyrococcus furiosus, Pyrococcus woesei, Clostridium thermohydrosulfuricum*, Thermococcus species and Thermoanaerobacter species. Thermostable exo amylases are, for example, produced by the following organisms: *Clostridium thermosulfurogenes* (β-amylase), *Bacillus stearothermophilus* (β-amylase) and *Clostridium thermohydrosulfuricum* (amyloglucosidase).

Thermostable means that the enzyme is not inactivated during baking before the bulk of the starch has been gelatinized and thus has become accessible for starch degrading enzymes. Enzymes can only degrade starch after gelatinization and therefore have to be active during the baking at temperature between 65° C. and 95° C., preferably between 80° C. 95° C.

BRIEF DESCRIPTION OF THE DRAWING

The FIG. shows the firmness of the various bread crumbs as a function of the storage time.

The firmness of bread crumb is measured and defined as described by Baker et al., Cereal Foods World, Vol. 32, No. 7 (1987), p. 486 using a Voland-Stevens Texture Analyzer. However, many instruments and methods can be used to measure bread crumb firmness and the present method of measurement is only used to elucidate the present invention.

In the baking art, it is generally preferred that the resilience of the bread product does not change during storage over several days. In the FIG., this is expressed by curve (a) in which the firmness of the crumb remains constant for at least 3 to 5 days. It is recognized that when no compounds are added to the dough, the firmness of the bread will increase which is a well-known aspect of staling. In the FIG., curve (d) shows that for these bread products without additives, the firmness roughly doubles during the period between the first and fifth day.

The staling phenomenon has been thoroughly studied by the art, and many approaches for the retardation of staling have been proposed to the art. All these approaches have in common that the starting firmness is reduced radically. For example, the firmness can be reduced to a level after one day of almost half the level without such an addition. When the firmness roughly doubles between the first and fifth day, the firmness on the fifth day equals almost the starting firmness of the first day of bread without an addition. The effect of such a known addition is shown by curve (b). Between the second and fifth day, this curve (b) intersects curve (a). Therefore, the consumer will consider this bread as quite soft after the third and the fifth day of storage. By the addition of Promozyme ™ as described in the U.S. Pat. No. 4,624,216, no significant change of the curve (b) is noticed. The addition of the Promozyme ™ which is rather thermolabile resulted in a reduction of the gumminess but not in a substantial change of firmness In the present invention, the increase of the firmness of the bread crumb is retarded by selectively attacking the amylopectin component of the starch without substantially affecting the retrogradation of the amylose component of the starch. The present invention is shown in the FIG. as curve (c). The consumer will not only notice that the bread product will be quite fresh over a long period of time but will also experience that side-effects of emulsifiers or cereal/bacterial α-amylase, viz. the stickiness, gumminess and inferior slicing properties, are prevented.

As shown in the FIG., the firmness of the bread crumb may increase slightly over time. When the possibility of a relatively long storage time is desired, it is possible to add small amounts of an emulsifier and/or a cereal/bacterial α-amylase which takes care of a somewhat higher starting softness. However, lower quantities may be used to avoid the negative side effects of the higher quantities mentioned in the prior art for obtaining a crumb softening effect.

Various modifications of the process and the bread products of the invention may be made without departing from the spirit or scope thereof and it is to be understood that the invention is intended to be limited only as defined in the appended claims.

What is claimed is:

1. A process for the production of a bread product having a retarded rate of crumb firming during storage comprising adding to a dough at least one thermostable α-1,6-endoglucanase or α-1,4-exoglucanese which is active during baking at temperatures between 65° and 95° C. in an amount which is able to modify selectively during baking the crystallization properties of the amylopectin component.

2. The process of claim 1 wherein the temperatures are between 80° C. and 95° C.

3. The process of claim 1 wherein a thermostable α-1,6-endoglucanase is used.

4. The process of claim 3 wherein a thermostable pullulanase is also added to the dough.

5. The process of claim 1 wherein a thermostable α-1,4-exoglucanase is used.

6. The process of claim 5 wherein the enzyme is amyloglucosidase or β-amylase.

7. In a method for the retardation of crumb firming, the improvement comprising adding to a bread product dough in an effective amount of at least one of a thermostable α-1,6-endoglucanase or α-1,4-exoglucanese which is active during baking at temperatures between 65° and 95° C. which is able to prevent or at least to restrain retrogradation of the amylopectin component of the bread product.

8. A bread product obtained by the process of claim 1.

9. An improved flour composition for the preparation of bread and other cereal based foodstuffs containing normal additives characterized in that it contains 250–75,000 U/kg of flour of a thermostable pullulanase for retarding retrogradation of amylopectin.

10. The composition of claim 9 containing 50,000 to 250,000 U/kg of enzyme for retarding retrogradation amylopectin.

11. An improved flour composition for the preparation of bread and other cereal based foodstuffs containing normal additives characterized in that it contains 25,000–500,000 U/kg of flour of thermostable amyloglucosidase for retarding retrogradation of amylopectin.

12. The composition of claim 11 containing 50,000 to 250,000 U/kg of enzyme for retarding retrogradation of amylopectin.

13. An improved flour composition for the preparation of bread and other cereal based foodstuffs containing normal additives characterized in that it contains 12,500–250,000 U/kg of flour of thermostable α-amylase for retarding retrogradation of amylopectin.

14. The composition of claim 13 containing 25,000 to 125,000 U/kg of thermostable β-amylase.

* * * * *

UNITED STATES PATENT AND TRADEMARK OFFICE
Certificate

Patent No. 5,023,094                                                              Patented: June 11, 1991

On motion pursuant to 37 CFR § 1.634 in Interference No. 103,123, it has been found that the above identified patent, through error and without any deceptive intention, incorrectly sets forth the inventorship.

Accordingly, pursuant to 35 U.S.C. § 256 it is hereby certified that the correct inventorship of this patent is: Johannes H. Van Eijk and Brain E. Jones.

Signed and Sealed this Eighth Day of June, 1999.

MARY F. DOWNEY
*Administrative Patent Judge*
Board of Patent Appeals and Interferences